United States Patent [19]

Evans et al.

[11] Patent Number: 4,849,502

[45] Date of Patent: Jul. 18, 1989

[54] METHOD OF REGULATING THE POLYMERIZATION OF CYCLIC POLYCARBONATE WITH INITIATOR AND POLYHYDRIC PHENOL

[75] Inventors: Thomas L. Evans, Clifton Park; Carol B. Wasserman, Hartsdale, both of N.Y.

[73] Assignee: General Electric Company, Schenectady, N.Y.

[21] Appl. No.: 158,450

[22] Filed: Feb. 22, 1988

[51] Int. Cl.[4] .............................................. C08G 63/62
[52] U.S. Cl. .................................... 528/371; 528/196; 528/370; 528/377; 528/378; 528/379
[58] Field of Search ............... 528/371, 370, 378, 379, 528/377

[56] References Cited

U.S. PATENT DOCUMENTS 3,386,954  6/1968  Schnell et al. ..................... 528/371
4,736,013  4/1988  Hathaway et al. ................. 528/196

*Primary Examiner*—Harold D. Anderson
*Attorney, Agent, or Firm*—William A. Teoli; James C. Davis, Jr.; William H. Pittman

[57] ABSTRACT

A phenol or bisphenol has been found effective as a chain transfer agent in the polymerization of cyclic carbonates to make hydroxyl-terminated polycarbonate oligomer of varying molecular weight.

3 Claims, 1 Drawing Sheet

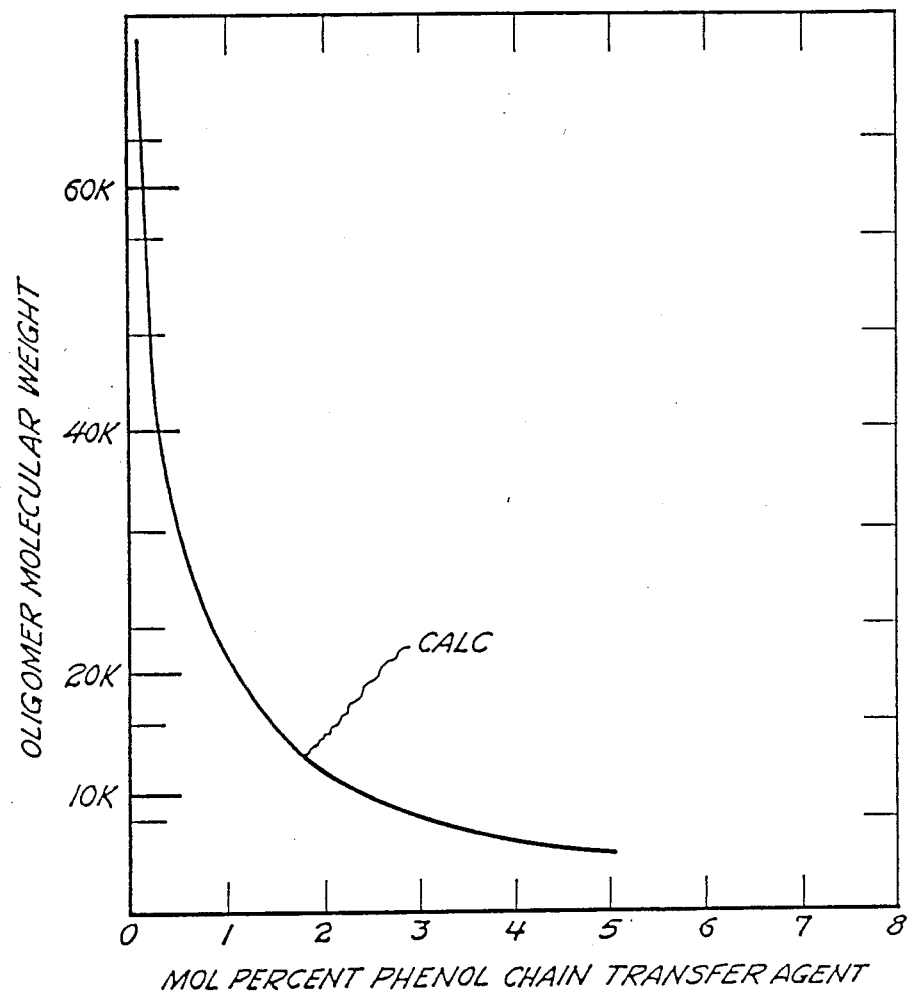

METHOD OF REGULATING THE POLYMERIZATION OF CYCLIC POLYCARBONATE WITH INITIATOR AND POLYHYDRIC PHENOL

CROSS-REFERENCE TO RELATED APPLICATIONS

Reference is made to copending applications of Evans et al., for Ser. No. 124,127, filed Nov. 23, 1987, for METHOD FOR PREPARING BLOCK POLYPHENYLENE ETHER-POLYCARBONATES, and Ser. No. 158,411, filed Feb. 22, 1988, filed concurrently herewith for METHOD FOR MAKING SILICONEPOLYCARBONATE BLOCK COPOLYMERS, both of which are assigned to the same assignee as the present invention and incorporated herein by reference.

BACKGROUND OF THE INVENTION

The present invention relates to a method for regulating the polymerization of cyclic polycarbonates using a polymerization initiator and a phenol or polyphenol as a chain-transfer agent. More particularly, the present invention relates to a method for making hydroxyl-terminated polycarbonate oligomers of a predetermined molecular weight.

As used hereafter, the term cyclic polycarbonate, polycarbonate, or cyclic polycarbonate oligomer means cyclics or polymers made from the reaction of bisphenols, such as bisphenol-A with phosgene.

Prior to the present invention, one method of regulating the molecular weight of polycarbonates involved the employment of a diarylcarbonate as a chain-transfer agent.

Although diarylcarbonate has been found to be an effective chain-transfer agent, the polycarbonate chains made by this procedure are capped with arylcarbonate end-groups. It would be desirable, therefore, to provide a method for polymerizing cyclic carbonate with a chain-transfer agent which would result in hydroxyl-terminated polycarbonate oligomers as well as offer greater potential for making copolymers, as well as provide cross-linking of polycarbonates during polymerization.

The present invention is based on the discovery that phenols, including polyhydric phenols, can be used effectively as chain-transfer agents for the polymerization of cyclic carbonate if used in combination with an effective amount of a polymerization initiator. There can be obtained hydroxyl-terminated polycarbonate oligomer having a predetermined block size which can be made under solution blending or melt polymerization conditions.

STATEMENT OF THE INVENTION

There is provided by the present invention, a method for regulating the polymerization of cyclic carbonate to produce oligomeric carbonate having a predetermined molecular weight which comprises heating a cyclic carbonate in the presence of an effective amount of a cyclic carbonate polymerization initiator and sufficient monohydric or polyhydric phenol to produce hydroxyl-terminated polycarbonate oligomer.

Cyclic polycarbonate oligomers which can be used in the practice of the present invention are shown by Brunelle et al., U.S. Pat. No. 4,644,053, assigned to the same assignee as the present invention, and incorporated herein by reference. Th cyclic polycarbonate oligomers has the formula,

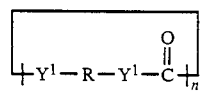

wherein each R is independently a divalent aliphatic, alicyclic or aromatic radical and each $Y^1$ is independently oxygen or sulfur and n has a value of from 2 to about 30.

Monohydric or polyhydric phenols which can be used in the practice of the present invention for the regulation of molecular weights of polycarbonates prepared by means of ring opening polymerization of cyclic oligomeric carbonates as previously defined are, preferably phenol, and bisphenol-A. Additional phenols which can be utilized are shown by the following formula, $$R(OH)_x, \qquad (2)$$

where R is a monovalent or polyvalent divalent aromatic organic radical having from about 6–30 carbon atoms and x is an integer having a value of 1 to 6 inclusive. Some of the aromatic radicals included by R are, for example, phenylene,

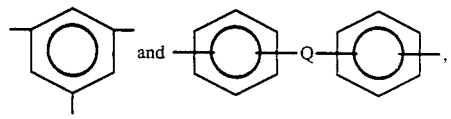

where Q is a member selected from $SO_2$, —S—, and —$(C)_y(H_2)_y$, and where y is an integer equal to 1 to 5 inclusive.

In instances where cross-linked or branched polycarbonate products are desired, phenols with hydroxyl contents greater than 2 per molecule such as tetraphenols can be used as shown, for example, by the following formula,

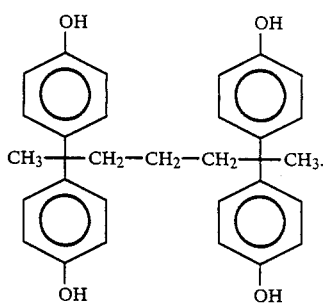

In the practice of the present invention, the polymerization of cyclic carbonate can be conducted under neat conditions or in the presence of an organic solvent. In instances where the polymerization is conducted in the presence of an organic solvent, temperatures in the range of from −10° C. to 300° C. can be employed. Suitable organic solvents which can be used are, for example, N,N-dimethylformamide, tetrahydrofuran, diethylether, ethylene glycol dimethylether, methylene chloride or o-dichlorobenzene.

In instances where polymerization is conducted under neat conditions, temperatures in the range of from 200° C. to 350° C. can be used. Polymerization initiators which can be employed to initiate the polymerization of the cyclic carbonate are shown, for example, by Brunelle et al., U.S. Pat. No. 4,644,053 incorporated herein by reference. There can be used, for example, sodium phenoxide, tetrabutylammonium tetraphenylborate, lithium 2,2,2-trifluoroethoxide, n-butyl lithium and sodium benzoate. In addition, there can be used as polymerization initiators dioctyltin oxide, triethanolaminetitanium isopropoxide, tetra(2-ethylhexyl) titanate and polyvalent metal (especially titanium and aluminum) chelates such as bisisopropoxytitanium bisacetylacetonate (commercially available under the tradename "Tyzor AA") and the bisisopropoxyaluminum salt of ethyl acetoacetate. Among the preferred catalysts are lithium stearate and bisisopropoxytitanium bisacetylacetonate.

Reference is made to the drawing showing a curve illustrating the inverse relationship between oligomer molecular weight and mol percent phenol chain-transfer agent.

An effective amount of the monohydric or polyhydric chain transfer agent will vary, depending upon the chain length desired in the final hydroxy-terminated oligomer. It has been found, for example, that from about 1 mole percent to 3 mole percent of phenol chain-transfer agent will provide for a number-average molecular weight in the range of from about 18,165 to 6,279.

An effective amount of polymerization initiator is, for example, 0.001–1.0 mole percent based on moles of structural units in the oligomer mixture.

The hydroxy-terminated oligomers made in accordance with the practice of the present invention can be used to make block copolymers, such as silicone block copolymers as shown in copending application Ser. No. 158,411, filed concurrently herewith, and incorporated herein by reference.

In order that those skilled in the art will be better able to practice the present invention, the following examples are given by way of illustration and not by way of limitation. All parts are by weight.

EXAMPLE 1

Premixtures were prepared of 3 grams of cyclic polycarbonate, 0.0033 gram of tetrabutylammonium tetraphenylborate initiator, and 30 mL of dry methylene chloride. To one of the mixtures there was added 0.0704 gram (2 mole %) of dicumylcarbonate relative to carbonate repeat units in the cyclic carbonate. To one of the remaining two mixtures there was added 0.059 gram (2 mole %) of a bisphenol-A relative to carbonate repeat units. The solvent was removed by rotoevaporation of the three mixtures and the samples dried for two hours before polymerization was attempted. 0.05 gram of each of the mixtures was then heated to 250° C. for 30 minutes under nitrogen. Molecular weights of the resulting polycarbonates were then determined by gel permeation chromatography (relative to polystyrene standards). The following results were obtained, where CTA is chain-transfer agent:

TABLE I

| | CTA | Mw | Mn |
|---|---|---|---|
| 1. | None | 90,745 | 18,419 |
| 2. | Dicumylcarbonate | 33,323 | 11,852 |

TABLE I-continued

| | CTA | Mw | Mn |
|---|---|---|---|
| 3. | Bisphenol-A | 25,092 | 6,097 |

The above results show that bisphenol-A is an effective molecular weight regulator for the polymerization of the cyclic carbonate.

EXAMPLE 2

The procedure of Example 1 was repeated, except that 0.0322 gram (2 mole %) of mesitol was used as a chain-transfer agent compared to the same mole % of bisphenol-A in the cyclic mixture. The following results were obtained:

TABLE II

| | CTA | Mw | Mn |
|---|---|---|---|
| 1. | Control | 90,745 | 18,419 |
| 2. | Mesitol | 24,554 | 8,401 |
| 3. | BPA | 23,367 | 5,089 |

The above results show that mesitol also leads to effective molecular weight regulation.

EXAMPLE 3

The procedure of Example 1 was repeated employing mixtures of 1 gram cyclic carbonate, 0.0008 gram or (0.05 mole) of tetramethylammonium tetraphenylborate as a polymerization initiator. In one of the mixtures, there was used 0.0107 gram of mesitol while 0.0180 gram of bisphenol-A was used in another mixture. A mixture also was prepared having 0.0235 gram of dicumyl carbonate. The various mixtures were polymerized at 250° C. for 0.50 hour. The resulting products were then dissolved in methylene chloride and precipitated into methanol and thereafter collected by filtration. After drying, the products were then reprecipitated in acetone. The samples were then examined by by Fourier Transform infrared spectroscopy. A determination of hydroxyl end-group content was made by examining the samples in the hydroxy overtone region of the spectrum and comparing the peak areas to a standard calibration. The following results were obtained:

TABLE III

| | | Hydroxyl Wt % | Mw | Mn |
|---|---|---|---|---|
| 1. | Dicumylcarbonate | 0.024 | 79,423 | 26,442 |
| 2. | Mesitol | 0.070 | 47,673 | 22,838 |
| 3. | Bisphenol-A | 0.134 | 44,215 | 18,115 |

The above results show that the use of bisphenol-A doubles the hydroxyl content in the final polycarbonate oligomer as compared with mesitol.

EXAMPLE 4

A mixture was prepared as in Example 1 from 2 grams of cyclic carbonate and 0.004 gram of tetrabutylammonium tetraphenylborate. In addition, there was used 0.09 gram or (2.5 mole %) of a tetraphenol of the formula,

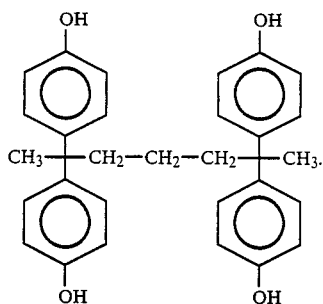

The mixture was polymerized at 300° C. for 30 minutes. The resulting product was extracted in methylene chloride and compared to the original weight of the sample before extraction. % Gel obtained was found to be 20%. This demonstrates that branching and partial cross-linking of the polycarbonate product occurred.

Although the above examples are directed to only a few of the many variables which can be used in the practice of the method of the present invention, it should be understood that the method of the present invention can use a much broader variety of cyclic carbonate, cyclic carbonate polymerization initiator and monohydric or polyhydric phenol as shown in the description preceding these examples.

What is claimed and sought to be protected by Letters Patent of the United States is as follows:

1. A method for regulating the polymerization of a cyclic polycarbonate having the formula

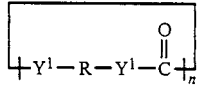 (1)

to produce an oligomeric carbonate having a number average molecular weight in the range from about 6,279 to about 18,165 which comprises heating the cyclic polycarbonate in the presence of 0.001–1.0 mole percent, based on the moles of carbonate structural units in the polymerization mixture of tetrabutylammonium tetraphenylborate and sufficient polyhydric phenol to produce a hydroxy-terminated polycarbonate oligomer, wherein each R is independently a divalent aliphatic, alicyclic or aromatic radical, and each $Y^1$ is independently oxygen or sulfur and n has a value of from about 2 to about 30.

2. A method in accordance with claim 1, where the polyhydric phenol is bisphenol-A.

3. A method in accordance with claim 1, where the cyclic polycarbonate is the reaction product of bisphenol-A and phosgene.

* * * * *